3,030,276
METHOD OF MAKING FUMARIC ACID AND UREA FROM LIGNIFIED CELLULOSE
Alfred M. Thomsen, 265 Buckingham Way, Apt. 402, San Francisco, Calif.
Filed Feb. 9, 1960, Ser. No. 7,595
4 Claims. (Cl. 195—36)

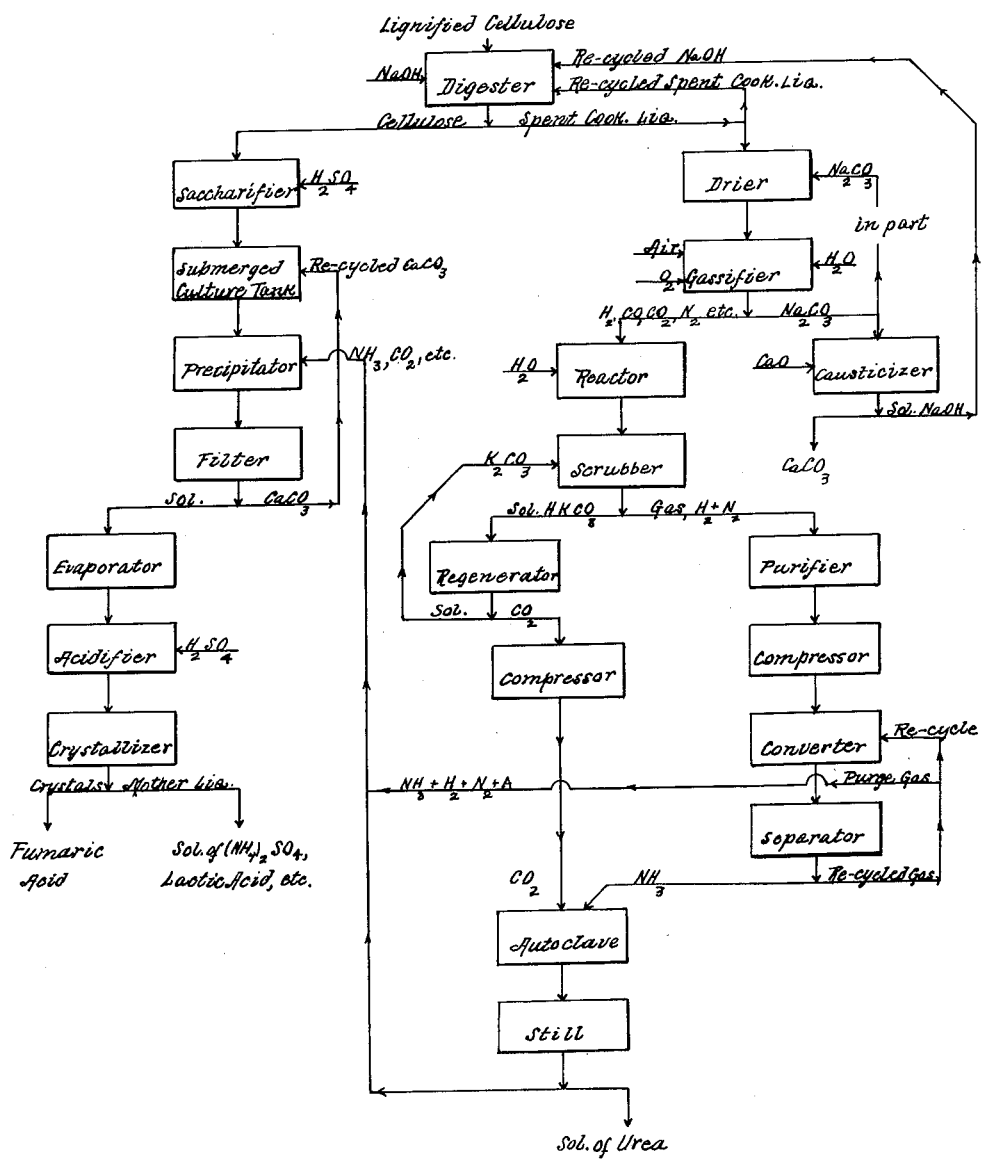

As the title indicates my process consists of the simultaneous production of two diverse substances, to wit: Fumaric acid and urea from the same parent substance, lignified cellulose, the commonest form of which is any "woody" substance. No other raw material is consumed in the operation save nitrogen from the atmosphere, accompanying oxygen and the ever present water.

Owing to its cost, fumaric acid is as yet of little importance though its role as an intermediate in the formation of maleic anhydride is well known. Urea and its production is too well known to need any description, but it is the aim and object of my process to link the simultaneous production of both in such a manner that the discard from one series of steps supplements the need of the other series, eliminating all waste effort and cheapening the cost of both. When viewed in this light lignified cellulose becomes a substance of much importance as a source of material now almost exclusively drawn from the realm of coal and petroleum, natural gas being considered as the gaseous phase of the latter, or both.

The best way to evaluate said linkages is to follow the specific steps as indicated on the attached flow sheet. It will be obvious that the chemical reactions involved are all old, only the combinations being new. That, however, is the important part for it is upon such that the economy, hence, the value of my process rests. While explaining my process in this manner I shall also give any specific information as to how sundry of these steps are best performed, so converting a simple explanation into a specific illustration pointing out the invention. In many cases, when I use the expression, "purely conventional" I assume that the reader is sufficiently familiar with the subject involved so that a fuller explanation would be superfluous.

At the top of the drawing I have indicated such a conventional step. The lignified cellulose is digested with caustic soda until substantially all the non-cellulose has been dissolved. This is obviously the old soda process of wood pulping, so no description is needed. Separation is then made between the spent cooking liquor and the fibers, cellulose. The spent liquor is reserved for further treatment, the cellulose is treated with dilute sulphuric acid until converted into sugars. While it is uncommon to use pulp for this purpose it is not unknown. All conditions as to time and temperature are similar to those employed in the saccharification of wood, the only distinction resting in the absence of lignin, a manifest advantage. As based upon wood directly, such procedure is now standard European practice so no further explanation seems required. However, owing to the advantage of lignin absence it is easy to use a continuous digestion at about 125 lbs. gage pressure until about one-half of the cellulose has been converted, separating the unconverted cellulose and re-cycling same to another digestion, thus increasing the sugar yield.

The sugar solution thus produced is next used as food for a microorganism suitable for the conversion of said sugar into fumaric acid. Many types are available. Sundry species of Penicillium, Aspergillus, and Rhizopus all produce varying amounts of fumaric acid together with other kindred organic acids such as lactic and succinic, as well as some alcohol. I prefer, however to use a well known strain of the latter genus, to wit, *Rhizopus higricans*. With this species, using the standard type of submerged culture familiarized in growing penicillin and citric acid, a yield of up to 60% of the sugar as fumaric acid is readily obtained. All standard procedure as to time, temperature, excess of calcium carbonate, etc. will be identical with such well known technique. In common with all such directions, however, I wish to call attention to a well known fact that actual culture may be varied within rather wide limits directed solely by the commercial yield, fumaric acid. In common with citric acid, one salient feature soon becomes evident that the presence, or deficiency, of a trace element is of vital significance. The literature abounds in allusions to the significance of zinc which may be true in laboratory experiments but is not borne out in commercial work. In such matters, trial and error is the only true guide.

Passing the submerged culture tank I next show a precipitator in which the fumarate of calcium is decomposed with carbonated ammonia, yielding a re-cycled calcium carbonate and a solution of ammonium fumarate. This is next evaporated to any desired consistency and then decomposed with sulphuric acid. Obviously stoichiometric quantities are required. The sparingly soluble fumaric acid is then easily crystallized out from the resulting ammonium sulphate solution, which in turn is crystallized from the latter salt, forming a valuable by-product.

I will now describe the right hand side of my drawing. The spent cooking liquor is de-hydrated in a drier, but I have shown a portion of said spent liquor re-cycled to the digestion step. In this manner it becomes economically concentrated so that a separate evaporator with its large steam consumption is no longer needed. To a small extent this is standard pulp technique but too large a recycle would result in damage to the pulp. In this case, as the only interest is the cellulose, per se, not in the physical characteristics of the fiber, it may be pursued at will. I have also shown a re-cycle to the drier of sodium carbonate obtained in a later step which will be explained later on.

The dried product then passes to a "reactor" where it is contacted with a mixture of oxygen, atmospheric air, and steam. A conventional Herreshoff furnace will serve as well as any device for bringing about a counter-current flow between the dried solids and the gases. The temperature may be anywhere between 1000° F. and 2000° F. It is preferred to keep the temperature somewhere near 1200° F. Obviously the higher the temperature the speedier the reaction will be but at the higher temperature the carbon will be largely in the form of carbon monoxide while in the lower bracket much carbon dioxide will form with correspondingly greater formation of hydrogen. The reactions may be represented by the following equations:

$$C + H_2O = CO + H_2$$
$$C + 2H_2O = CO_2 + 2H_2$$

Both are endothermic but the first equation requires twice as much heat as the latter. As a source of hydrogen, therefore, the second equation is much to be preferred. However, if the carbon be coke or the lampblack produced on pyrolysis it is lamentably slow so the high temperature effect is the standard practice of today.

Contrariwise, if the raw material processed be the carbon derived from such a spent liquor as I have described then the low temperature equation becomes feasible. Such carbon is highly reactive at the lower temperature and this is aided by the catalytic influence of the sodium carbonate being produced. It is for this reason that I have shown a partial re-cycle of such sodium carbonate. Obviously, the part played by the oxygen addition is to furnish the heat necessary to bring about the aforementioned reactions so that said reactions, collectively regarded, become exothermic. The operation, therefore, consists in so proportioning air and oxygen that the customary 3:1 ratio between hydrogen and nitrogen be achieved.

It is, of course, impossible to bring this about without some formation of carbon monoxide. I have, therefore, shown the gases leaving the "gasifier" entering a "reactor" containing the conventional catalyst, such as ferric oxide, where it is contacted with additional steam and the carbon monoxide becomes substantially converted to the dioxide with more formation of hydrogen. This step is, of course, exothermic and entirely conventional.

In the next step, the scrubber, I have shown these gases contacted with a solution of potassium carbonate which removes the carbon dioxide forming the acid carbonate. In actual practice this step would be introduced also between gasifier and reactor as the reaction in the latter is much facilitated by the removal of most of the carbon dioxide in the traversing gas stream. In any event, the acid carbonate formed is boiled in the "regenerator" with evolution of the carbon dioxide absorbed. Also this entire procedure is too conventional to require anything but mention. Obviously, other absorbents such as the ethanolamines could be substituted for potassium carbonate without prejudice.

The gas leaving the scrubber is the conventional mixture of hydrogen and nitrogen required in ammonia synthesis. I have indicated its further purification, compression, and conversion to ammonia, but as this is entirely conventional no description is needed. Said ammonia and the carbon dioxide from the regenerator are now commingled in the "autoclave" at a temperature of approximately 350° and at approximately 200 atmospheres. This is the conventional urea synthesis, but I operate on a "one pass" basis with a conversion of rather less than 50%. Such a departure is far from standard, most recent patents on urea dealing with the ways and means whereby the "off-gas" can be introduced once more into the autoclave. In the instant departure that would be senseless as the "off-gas" is ideal for the conversion of calcium fumarate into the ammonia salt with consequent re-cycling of the calcium carbonate produced. By thus linking urea production with fumaric acid manufacture and basing both upon lignified cellulose I have improved the economic situation of both. Added to this is the fact that all sulphuric acid called for and all ammonia not converted to urea become a salable by-product, to wit, ammonium sulphate.

The only raw material called for is this lignified cellulose of which the world enjoys a liberal and annually renewable source. Barring minor losses, all soda is re-cycled and all lime is likewise re-cycled. In the drawing I have indicated the causticizing of the recovered soda, but I have not indicated the re-burning of the calcium carbonate produced. Such procedure is, of course, standard practice whenever a caustic soda cook is in use, hence any description would be redundant. Another minor advantage that may be mentioned is a use for the purge gas from ammonia synthesis thus diminishing the argon content in the synthesis loop, as I have indicated on the drawing.

Throughout my description I have confined myself rigorously to a single version of my process so as to make this disclosure a complete example and illustration which any one can readily follow. Of course, I have presumed that the reader is familiar with all the various branches of technology involved herein, to wit, pulping, cellulose saccharification, biochemistry as far as it relates to the culture of micro-organisms, oxidation of carbon with steam as a means of making hydrogen, production of ammonia and urea and such facts of general chemistry as enter occasionally. To the one who is but cursorily acquainted with one or more of these subjects I suggest recourse to the excellent literature on the subjects with which he may not be too familiar. All omissions from my disclosure, if there seem to be any, will readily be found to be but common knowledge to any one "skilled in the art" relating to that particular field of endeavor with which may reader may not be well versed. To such a one, however, my descriptions will appear entirely adequate provided only that the adequate "skill" be there.

But apart from the standard version as herein given there are many possible modifications. I have already called attention to a two-stage removal of carbon dioxide. Similarly, while it is well known that abundant aeration is desirable in the culture of the micro-organism selected, nevertheless, such aeration may not be introduced in the fumaric acid step, per se. It is quite possible to pursue such aeration separately from the submerged culture vessel with little attendant formation of the acid. All such modifications I believe to be within the limits of my disclosure.

Having thus fully described my process, I claim:

1. The manufacture of fumaric acid from lignified cellulose which comprises; digesting said lignified cellulose with a solution of caustic soda under the conventional limitations as to alkali concentration, time and temperature, until substantially all the non-cellulose portion shall have been dissolved; separating the spent cooking liquor for subsequent conventional regeneration and re-cycling to said digestion step from the cellulose residual and saccharifying the latter with dilute sulphuric acid under the conventional limitations as to acid concentration, time and temperature; commingling the resultant sugar solution with a re-circulated excess of calcium carbonate produced in a subsequent step and with a micro-organism suitable for the conversion of sugar into fumaric acid; commingling the resultant mixture of calcium sulphate, fumarate and carbonate with sufficient carbonated ammonia to decompose all such sulphate and fumarate forming calicum carbonate and sulphate and fumarate of ammonium; separating and re-cycling such calcium carbonate and evaporating the resultant solution to substantial saturation and acidifying said solution of ammonium sulphate and ammonium fumarate with the stoichiometric amount of sulphuric acid to decompose all resident fumarate and crystallizing out the liberated fumaric acid from the residual solution of ammonium sulphate.

2. The method of manufacturing urea from lignified cellulose which comprises; digesting said lignified cellulose with a solution of caustic soda under conventional limitations as to alkali concentration, time and temperature, until substantially all the non-cellulose portion shall have been dissolved; separating the spent cooking liquor from the cellulose residual and dehydrating said liquor; commingling the residual solids in counter-current flow with a gas stream consisting of water vapor, air and oxygen under a temperature between a low of 1000° F. and a high of 2000° F. until the carbon of said solids shall have been substantially gasified with attendant production of sodium carbonate said carbonate being then causticized and re-cycled as a regenerated caustic soda cooking liquor to the initial caustic soda digestion step; further treating the gases thus produced to eliminate residual carbon monoxide by passing over a catalyst suitable for the conversion of said carbon monoxide into carbon dioxide by reaction with water vapor; absorbing the carbon dioxide from the resultant mixture of hydrogen and nitrogen and so regulating the relative proportion of air and oxygen that said hydrogen shall be approximately three times the nitrogen, by volume; compressing and converting said mixture of hydrogen and nitrogen in conventional manner into ammonia gas; commingling said ammonia with carbon dioxide previously removed from the hydrogen-nitrogen-carbon dioxide mixture under a pressure of approximately 200 atmospheres and a temperature of approximately 350° F., in the presence of water vapor, until approximately one-half shall have been converted into urea solution; and separating said urea solution from the un-converted ammonia-carbon dioxide mixture.

3. The method of manufacturing fumaric acid and urea from lignified cellulose which comprises; digesting said lignified cellulose with a solution of caustic soda under the conventional limitations as to alkali concentration, time and temperature until substantially all the non-cellulose portion shall have been dissolved; separating the spent cooking liquor from the residual cellulose, reserving said spent liquor for subsequent treatment; saccharifying the cellulose with dilute sulphuric acid under the conventional limitations as to acid concentration, time and temperature; commingling the resultant sugar solution with a re-circulated excess of calcium carbonate, subsequently regenerated, and with a micro-organism suitable for the conversion of sugar into fumaric acid; commingling the resultant mixture of calcium sulphate, fumarate, and carbonate with sufficient carbonated ammonia to decompose all such sulphate and fumarate forming calcium carbonate and sulphate and fumarate of ammonium; separating and re-cycling such calcium carbonate and evaporating the resultant solution to substantial saturation; acidifying said concentrated solution of ammonium sulphate and fumarate with the stoichiometric amount of sulphuric acid to decompose all resident fumarate and crystallizing out the liberated fumaric acid from the residual solution of ammonium sulphate; dehydrating the spent cooking liquor, previously reserved, and commingling the residual solids in counter-current flow with a gas stream consisting of water vapor, air and oxygen, under a temperature between a low of 1000° F. and a high of 2000° F. until the carbon of said solids shall have been substantially gasified with attendant production of sodium carbonate, said carbonate being then causticized and re-cycled as a regenerated caustic soda cooking liquor to the initial caustic soda digestion step; further treating the gases thus produced to eliminate residual carbon monoxide by passing over a catalyst suitable for the conversion of carbon monoxide to carbon dioxide by reaction with water vapor; absorbing the carbon dioxide from the resultant mixture of hydrogen and nitrogen and so regulating the relative proportion of air and oxygen that said hydrogen shall occupy approximately three times the volume of nitrogen; compressing and converting said mixture of hydrogen and nitrogen in conventional manner into ammonia gas; commingling said ammonia with the carbon dioxide previously removed from the hydrogen-nitrogen-carbon dioxide mixture under a pressure of approximately 200 atmospheres and a temperature of approximately 350° F., in the presence of water vapor, until approximately one-half shall have been converted into a solution of urea; separating said urea solution from the unconverted gases and employing same as the carbonated ammonia where and as previously specified.

4. The method of making a synthesis gas suitable for ammonia manufacture from the spent cooking liquor of the paper-pulp industry which comprises; dehydrating said liquor and commingling the residual solids in counter-current flow with a gas stream consisting of water vapor, air and oxygen at a temperature of approximately 1200° F. until the carbon of said solids has been substantially gasified with attendant liberation of the resident sodium compounds as an ash, said ash being regenerated by conventional means to re-constitute a new cooking liquor suitable for re-cycling to the pulp making step; purifying the resultant gases from carbon monoxide by passing over a catalyst suitable for the conversion of carbon monoxide to dioxide by the action of water vapor; removing the carbon dioxide from the mixed gases and so regulating the ratio of air to oxygen that the final gas obtained after carbon dioxide removal shall have the desired 3:1 ratio between hydrogen and nitrogen.

References Cited in the file of this patent

UNITED STATES PATENTS

| | | |
|---|---|---|
| 2,510,668 | Thomsen | June 6, 1950 |
| 2,795,558 | Eastman | June 11, 1957 |
| 2,861,922 | Lubowitz et al. | Nov. 25, 1958 |

OTHER REFERENCES

Chemical Engineering Progress, July 1954, vol. 50, article by Cook, pages 327–331.